(12) United States Patent
Chen

(10) Patent No.: US 11,988,949 B2
(45) Date of Patent: May 21, 2024

(54) WAVELENGTH CONVERSION ELEMENT AND PROJECTION APPARATUS

(71) Applicant: Coretronic Corporation, Hsin-Chu (TW)

(72) Inventor: Chih-Ming Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/533,152

(22) Filed: Nov. 23, 2021

(65) Prior Publication Data

US 2022/0171269 A1 Jun. 2, 2022

(30) Foreign Application Priority Data

Nov. 30, 2020 (CN) .......................... 202011370151.8

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01)

(58) Field of Classification Search
CPC .... G03B 21/204; G02B 26/008; G02B 7/008; G02B 2207/113
See application file for complete search history.

(56) References Cited

U.S. PATENT DOCUMENTS

| | | | |
|---|---|---|---|
| 2006/0126199 A1* | 6/2006 | Jia ........................ | G02B 26/008 353/84 |
| 2008/0049346 A1* | 2/2008 | Cusick ................... | G03B 11/00 359/891 |
| 2015/0185596 A1* | 7/2015 | Hsieh ................... | G03B 21/142 353/84 |
| 2017/0127026 A1* | 5/2017 | Hsu ...................... | G03B 21/204 |
| 2017/0293211 A1* | 10/2017 | Kobayashi ............ | G03B 21/16 |
| 2018/0059403 A1* | 3/2018 | Takamatsu ........... | G02B 26/008 |
| 2019/0121119 A1* | 4/2019 | Chen .................... | H04N 9/3161 |
| 2019/0369471 A1* | 12/2019 | Mochizuki ............ | G03B 21/16 |

(Continued)

FOREIGN PATENT DOCUMENTS

| | | |
|---|---|---|
| CN | 206022421 U | 3/2017 |
| CN | 207611024 U | 7/2018 |

(Continued)

*Primary Examiner* — Magda Cruz

(57) ABSTRACT

A wavelength conversion element includes an illumination system, a light valve, and a projection lens. The illumination system is configured to provide an illumination beam. The light valve is disposed on a transmissive path of the illumination beam to convert the illumination beam into an image beam. The projection lens is disposed on a transmissive path of the image beam. The illumination system includes an excitation beam source and the aforementioned wavelength conversion element. The excitation beam source is configured to provide an excitation beam. The wavelength conversion element is disposed on a transmissive path of the excitation beam. A projection apparatus adopting the aforementioned wavelength conversion element is further provided. The substrate has good structural strength and the surface of the substrate has better flatness, so the excitation beam can be accurately focused on the wavelength conversion layer to maintain stable excitation efficiency.

9 Claims, 9 Drawing Sheets

(56) References Cited

U.S. PATENT DOCUMENTS

| | | | |
|---|---|---|---|
| 2020/0225462 A1* | 7/2020 | Hsu | H04N 9/3158 |
| 2020/0241405 A1* | 7/2020 | Nojima | G03B 21/204 |
| 2020/0310236 A1* | 10/2020 | Hsu | G03B 33/08 |

FOREIGN PATENT DOCUMENTS

| | | |
|---|---|---|
| CN | 111435216 A | 7/2020 |
| CN | 211826878 U | 10/2020 |
| JP | 2001267697 A | 9/2001 |
| JP | 2009053593 A | 3/2009 |
| TW | M555485 U | 2/2018 |
| WO | 2016147851 A1 | 9/2016 |
| WO | 2018103293 A1 | 6/2018 |

* cited by examiner

WAVELENGTH CONVERSION ELEMENT AND PROJECTION APPARATUS

CROSS-REFERENCE TO RELATED APPLICATION

This application claims the priority benefit of CN202011370151.8, filed on Nov. 30, 2020. The entirety of the above-mentioned patent application is hereby incorporated by reference herein and made a part of this specification.

FIELD OF THE INVENTION

The invention relates to a wavelength conversion element, and more particularly to a wavelength conversion element suitable for a projection apparatus, and a projection apparatus having the wavelength conversion element.

BACKGROUND OF THE INVENTION

A phosphor wheel of a known projection apparatus includes elements such as a phosphor layer, a substrate, and a metal ring. Generally, the metal ring is attached to the plane of the substrate in a plane, thereby increasing the structural strength of the substrate. The phosphor layer is attached to the substrate and surrounds the metal ring. The phosphor layer is excited by the excitation beam to generate the color beam required to form the projected image.

In the known art, although the metal ring is used to increase the structural strength of the substrate, the substrate still has the problem of insufficient structural strength, which causes the surface of the substrate to be uneven. Due to the poor flatness of the substrate, the excitation beam cannot always be accurately focused on the phosphor layer when the phosphor color wheel rotates, resulting in a variation in excitation efficiency. Thus, the brightness of the above-mentioned color beam may be unstable, thereby affecting the image quality of the projection apparatus.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength conversion element to solve the problem of unstable excitation efficiency in prior art.

The invention provides a projection apparatus having the advantage of good image quality.

Other advantages and objects of the invention may be further illustrated by the technical features broadly embodied and described as follows.

In order to achieve one or a portion of or all of the objects or other objects, a wavelength conversion element provided by the invention includes a substrate, a reinforcement plate, an adhesive layer, and a wavelength conversion layer. The substrate has a first engaging portion. The reinforcement plate is connected to the substrate and has a second engaging portion. The second engaging portion is correspondingly jointed with the first engaging portion. The adhesive layer is connected between the substrate and the reinforcement plate and is disposed between the first engaging portion and the second engaging portion. The wavelength conversion layer is disposed on the substrate.

In order to achieve one or a portion of or all of the objects or other objects, a projection apparatus provided by the invention includes an illumination system, a light valve, and a projection lens. The illumination system is configured to provide an illumination beam. The light valve is disposed on a transmissive path of the illumination beam to convert the illumination beam into an image beam. The projection lens is disposed on a transmissive path of the image beam. The illumination system includes an excitation beam source and the aforementioned wavelength conversion element. The excitation beam source is configured to provide an excitation beam. The wavelength conversion element is disposed on a transmissive path of the excitation beam.

The wavelength conversion element of the invention adopts the substrate having the first engaging portion and the reinforcement plate having the second engaging portion. Compared with the structure in which the metal ring and the substrate are attached in a plane manner in the known art, because the first engaging portion and the second engaging portion are concave-convex engaging structure, the substrate of the invention can not only maintain a good deformation resistance in the axial direction, but also improve the ability to resist deformation in the radial direction, thereby enhancing the structural strength of the substrate. Since the substrate has good structural strength, the surface of the substrate has better flatness, so that the excitation beam can be accurately focused on the wavelength conversion layer to maintain stable excitation efficiency. In addition, since the projection apparatus of the invention adopts the above-mentioned wavelength conversion element, the projection apparatus has the advantage of good image quality.

Other objectives, features and advantages of the invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
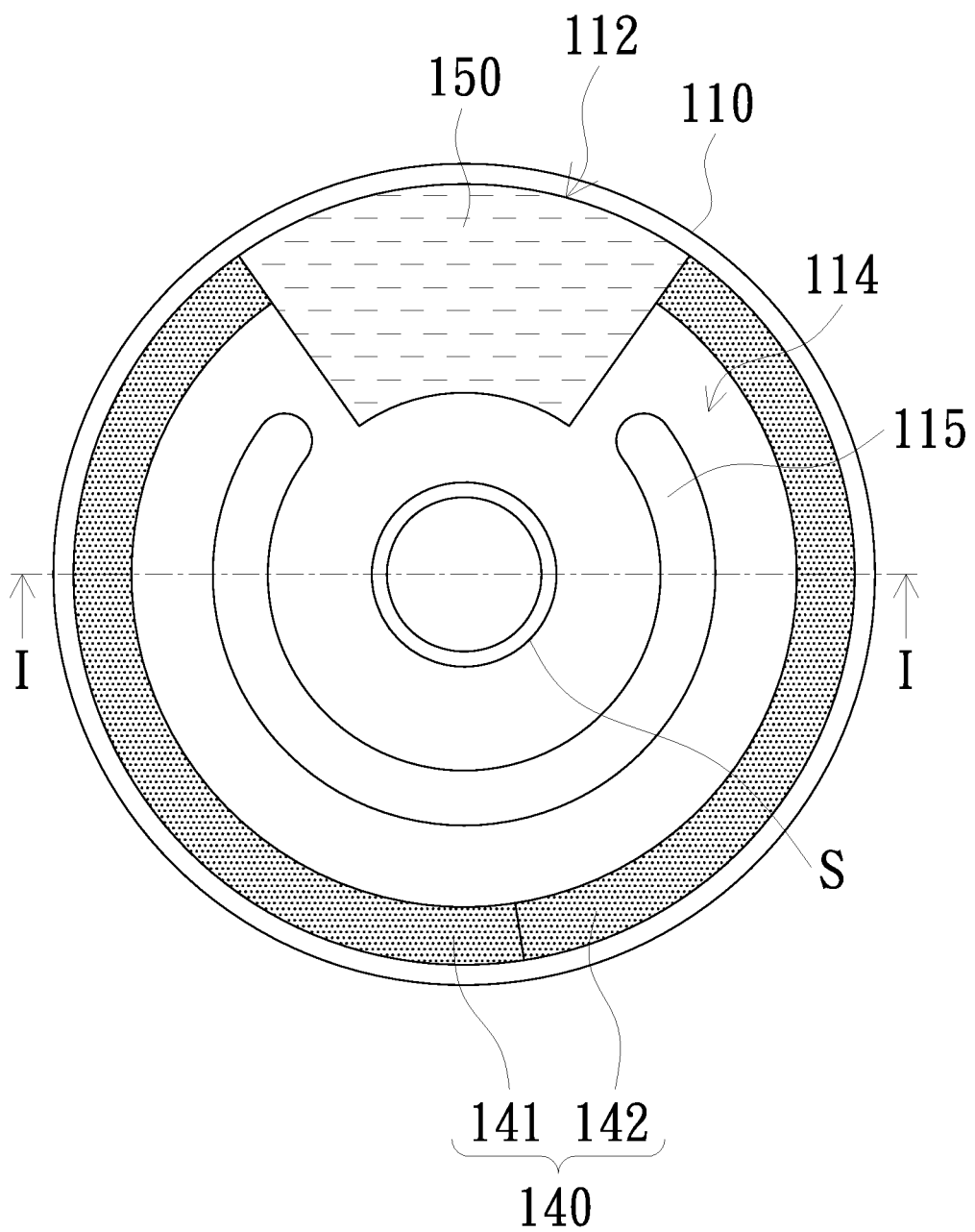
FIG. 1A is a schematic top view of a wavelength conversion element in accordance with an embodiment of the invention.
Figure 1B:
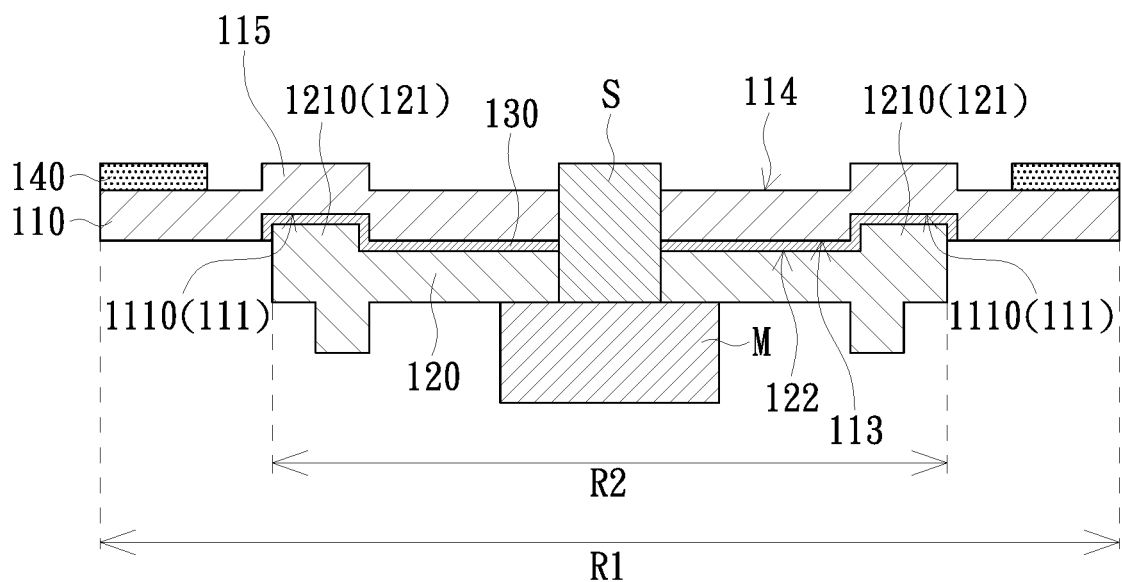
FIG. 1B is a schematic cross-sectional view of the wavelength conversion element, taken along the line I-I in FIG. 1A.
Figure 1C:
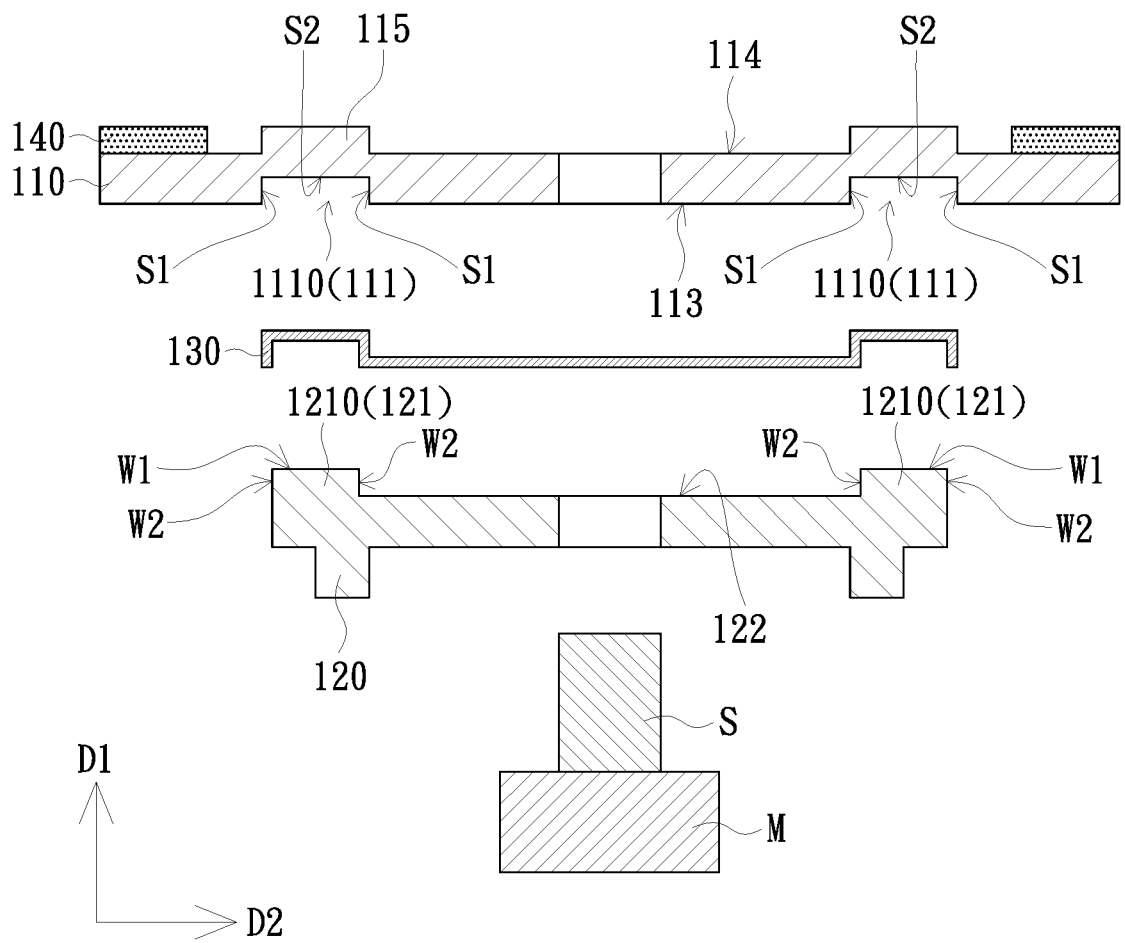
FIG. 1C is a schematic exploded diagram of the wavelength conversion element of FIG. 1B.

FIG. 1A is a schematic top view of a wavelength conversion element in accordance with an embodiment of the invention. FIG. 1B is a schematic cross-sectional view of the wavelength conversion element, taken along the line I-I in FIG. 1A. FIG. 1C is a schematic exploded diagram of the wavelength conversion element of FIG. 1B. Referring to FIGS. 1A to 1C, the wavelength conversion element 100 includes a substrate 110, a reinforcement plate 120, an adhesive layer 130 and a wavelength conversion layer 140. The substrate 110 has a first engaging portion 111. The reinforcement plate 120 is connected to the substrate 110 and has a second engaging portion 121. The second engaging portion 121 is correspondingly jointed with the first engaging portion 111; that is, the first engaging portion 111 and the second engaging portion 121 are aligned with each other, but are not in direct contact. The adhesive layer 130 is connected between the substrate 110 and the reinforcement plate 120, and is disposed between the first engaging portion 111 and the second engaging portion 121. In other words, in this embodiment, the first engaging portion 111 and the second engaging portion 121 are fixed with each other by the adhesive layer 130. In addition, the wavelength conversion layer 140 is disposed on the substrate 110.

The first engaging portion 111 mentioned is, for example, disposed on a surface 113 of the substrate 110, and the second engaging portion 121 is, for example, disposed on a surface 122 of the reinforcement plate 130. The adhesive layer 130 may not be limited to be disposed between the first engaging portion 111 and the second engaging portion 121 only. For example, the adhesive layer 130 may also extend toward the center of the substrate 110 and the reinforcement plate 120 from that between the first engaging portion 111 and the second engaging portion 121, so that the substrate 110 can be firmly connected to the reinforcement plate 120. The material of the adhesive layer 130 includes, for example, organic glue and/or inorganic glue. The organic glue may include silicone and epoxy, and the inorganic glue may include glass cement. The material of the adhesive layer 130 of this embodiment is not limited to the above, and other materials can be selected according to different design ways.

The wavelength conversion layer 140 is, for example, disposed on a surface 114 of the substrate 110. The wavelength conversion layer 140 may include a wavelength conversion material. The wavelength conversion material is, for example, fluorescent material, phosphorescent material (e.g., phosphor), or quantum dot (e.g., nanomaterial). The wavelength conversion layer 140 can emit beam with at least one wavelength after being irradiated by an excitation beam. For instance, the wavelength conversion layer 140 shown in FIG. 1A includes two wavelength conversion blocks 141, 142 having different wavelength conversion materials. Specifically, the wavelength conversion blocks 141, 142 are, for example, provided with a green wavelength conversion material and a yellow wavelength conversion material, so as to emit a green beam and a yellow beam after being irradiated by the excitation beam, respectively. Similarly, in one embodiment, the wavelength conversion layer 140 may include three wavelength conversion blocks (not show) having different wavelength conversion materials, and the three wavelength conversion blocks are, for example, provided with a green wavelength conversion material, a yellow wavelength conversion material, and a red wavelength conversion material respectively. The green wavelength conversion material, the yellow wavelength conversion material, and the red wavelength conversion material can emit a green beam, a yellow beam, and a red beam respectively after being irradiated by the excitation beam. In addition, in another embodiment, the number of the wavelength conversion blocks of the wavelength conversion layer 140 may be one. For example, the wavelength conversion layer 140 is provided with a yellow wavelength conversion material, so as to emit a yellow beam after being irradiated by the excitation beam.

The substrate 110 may be made of a material with high temperature resistance and better thermal conductivity. For instance, the material of the substrate 110 may be a metal having better thermal conductivity, such as aluminum, copper, silver, or an alloy thereof, but the material of the substrate 110 is not limited to the above-mentioned materials and metals.

Please refer to FIGS. 1B and 1C again. The rigidity of the reinforcement plate 120 is, for example, greater than the rigidity of the substrate 110, so as to enhance the overall structural strength of the wavelength conversion element 100. The rigidity of the reinforcement plate 120 being greater than the rigidity of the substrate 110 can be achieved by selecting different thicknesses or/and materials of the substrate 110 and the reinforcement plate 120. Specifically, the reinforcement plate 120 and the substrate 110 can be made of the same material, and the thickness of the reinforcement plate 120 can be greater than that of the substrate 110. For example, the materials of the reinforcement plate 120 and the substrate 110 both are aluminum alloy, the thickness of the reinforcement plate 120 may be between 1 mm to 10 mm, and the thickness of the substrate 110 may be less than 1 mm. In another embodiment, the reinforcement plate 120 and the substrate 110 can have similar thicknesses, and the rigidity of the material of the reinforcement plate 120 is greater than the rigidity of the material of the substrate 110. For example, the material of the substrate 110 is aluminum alloy, and the material of the reinforcement plate 120 is stainless steel which is more rigid than aluminum alloy. In this way, the rigidity of the reinforcing plate 120 can still be greater than the rigidity of the substrate 110 when the thicknesses of the reinforcing plate 120 and the substrate 110 are similar to each other. It is worth mentioning that the reinforcing plate 120 can be made of materials with better thermal conductivity, such as the aforementioned aluminum alloy or stainless steel, so that the reinforcing plate 120 can also enhance the thermal conductivity of the substrate 110, in addition to improving the structural strength of the substrate 110.

In this embodiment, the second engaging portion 121 of the reinforcement plate 120 may include a protrusion structure 1210 protruding from the surface 122 of the reinforcement plate 120, and the first engaging portion 111 of the substrate 110 may include a recess 1110 having a shape corresponding to the protrusion structure 1210. The recess 1110 is, for example, made by punching the substrate 110 from the surface 113, so a protrusion structure 115 is formed on the surface 114 of the substrate 110 corresponding to the recess 1110, but the invention does not limit the forming method of the recess 1110. In addition, the first engaging portion 111 extends along an annular track, for example, so the protrusion structure 115 in FIG. 1A extends the aforementioned annular track, and the second engaging portion 121 in FIG. 1B extends corresponding to the track of the first engaging portion 111. In other embodiments, the first engaging portion 111 may extend along a square track, a triangular track, a circular track, an elliptical track, or other tracks. The embodiment does not limit the extension track of the first engaging portion 111 and the second engaging portion 121.

Please refer to FIG. 1C again. The protrusion structure 1210 of the reinforcement plate 120 may have a top wall W1 opposite to the surface 122 and a side wall W2 connected between the surface 122 and the top wall W1. The recess 1110 of the substrate 110 may have a side face S1 opposite to the side wall W2 and a bottom face S2 opposite to the top wall W1. In this embodiment, the adhesive layer 130 is, for example, disposed between the side wall W2 and the side face S1 and between the top wall W1 and the bottom face S2, so that the first engaging portion 111 and the second engaging portion 121 can be tightly jointed.

In the wavelength conversion element 100 of this embodiment, because the first engaging portion 111 and the second engaging portion 121 are concave-convex engaging structures, the deformation resistance of the substrate 110 in the axial direction D1 and the radial direction D2 can be improved, so as to enhance the structural strength of the substrate 110. Because the substrate 110 has good structural strength, the surface of the substrate 110 has a better flatness, so that the excitation beam can be accurately focused on the wavelength conversion layer 140 to maintain stable excitation efficiency.

Please refer to FIG. 1A again. The substrate 110 of the embodiment may further have an optical zone 112. The optical zone 112 is, for example, an opening of the substrate 110, and may be located between the two adjacent wavelength conversion blocks 141, 142. The wavelength conversion element 100 may further include a plate body 150 disposed in the optical zone 112 of the substrate 110. The plate body 150 may have a shape corresponding to the optical zone 112 and be arranged in the optical zone 112. The plate body 150 may be a beam-transmitting plate, such as a glass substrate, for allowing the excitation beam to pass therethrough. A beam diffusion layer or a beam diffusion microstructure may be arranged on the beam-transmitting plate to eliminate speckles formed by the excitation beam. In one embodiment, the plate body 150 is, for example, an anti-reflection glass (AR glass). It is worth to mention that, because the optical zone 112 itself is an opening structure, the optical zone 112 can be used as a beam-transmitting zone for allowing the excitation beam to directly pass therethrough without being provided with the plate body 150 or other optical elements. In addition, the optical zone 112 can be changed to a reflection zone for reflecting the excitation beam according to different design requirements. In this case, the plate body 150 may be a reflective plate, and the optical zone 112 may not be arranged as an opening. Alternatively, the plate body 150 and the opening mentioned above may not be arranged on the substrate 110.

Please refer to FIGS. 1B and 1C again. The wavelength conversion element 100 may be a phosphor wheel. Specifically, the wavelength conversion element 100 may further include a motor M. The motor M has a shaft S. Please also refer to FIG. 1A. The substrate 110 and the reinforcement plate 120 may be ring-shaped and sleeved on the shaft S. In this embodiment, the reinforcement plate 120 may be fixed on the motor M, and the substrate 110 is fixed on the reinforcement plate 120. In this way, the motor M can drive the substrate 110 to rotate.

Figure 2:
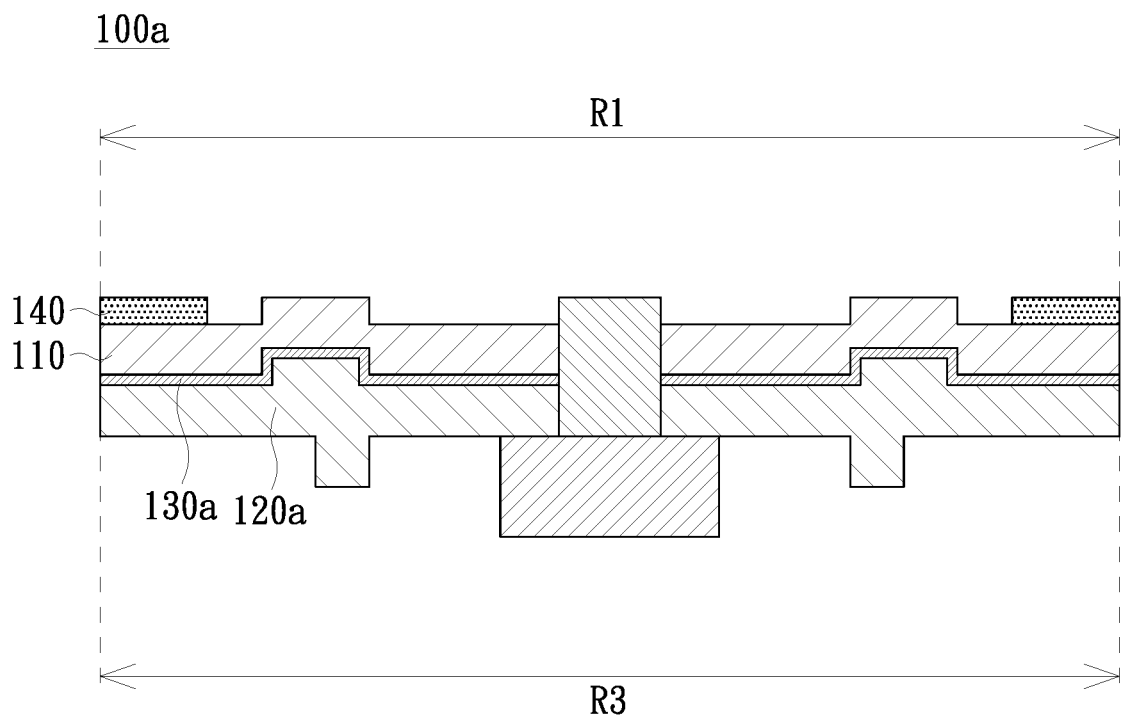
FIG. 2 is a schematic diagram of a wavelength conversion element in accordance with another embodiment of the invention.
Figure 3:
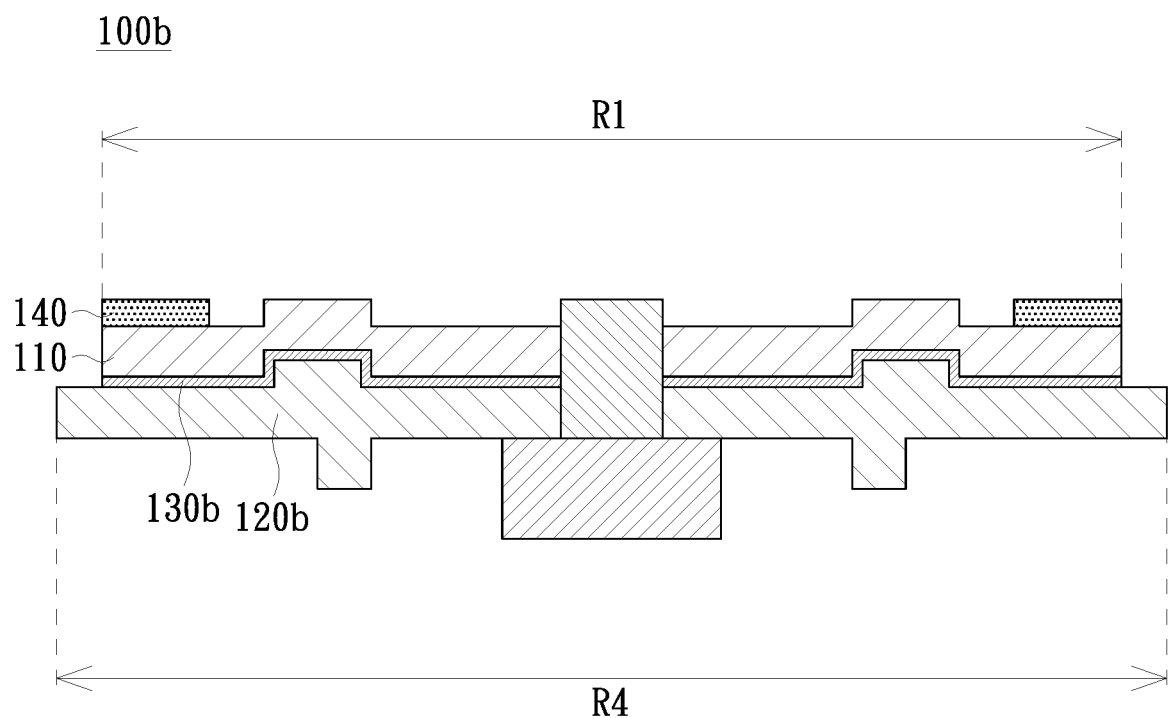
FIG. 3 is a schematic diagram of a wavelength conversion element in accordance with another embodiment of the invention.

Please continue to refer to FIG. 1B. The wavelength conversion layer 140 and the reinforcement plate 120 may be disposed on opposite sides of the substrate 110, so that the size of the reinforcement plate 120 is not limited to the position of the wavelength conversion layer 140. As described above, because the reinforcement plate 120 and the substrate 110 of the embodiment may be ring-shaped, the substrate 110 may have an outer diameter R1 and the reinforcement plate 120 may have an outer diameter R2. In this embodiment, the outer diameter R2 of the reinforcement plate 120 is, for example, smaller than the outer diameter R1 of the substrate 110, but is not limited thereto. For example, please refer to FIG. 2, which is a schematic diagram of a wavelength conversion element 100a in accordance with another embodiment of the invention. As shown in FIG. 2, the outer diameter R3 of the reinforcement plate 120a is equal to the outer diameter R1 of the substrate 110. The adhesive layer 130a may be disposed between the substrate 110 and the reinforcement plate 120a. Please refer to FIG. 3, which is a schematic diagram of a wavelength conversion element 100b in accordance with another embodiment of the invention. As shown in FIG. 3, the outer diameter R4 of the reinforcement plate 120b is larger than the outer diameter R1 of the substrate 110. The adhesive layer 130b may also be disposed between the substrate 110 and the reinforcement 120b. Because the embodiments of FIGS. 2 and 3 both increase the outer diameter R3 of the reinforcement plate 120a and the outer diameter R4 of the reinforcement plate 120b, the areas where the reinforcement plates 120a, 120b and the substrate 110 are fixed to each other are increased, so that the structural strength of the substrate 110 can be further improved.

Figure 4:
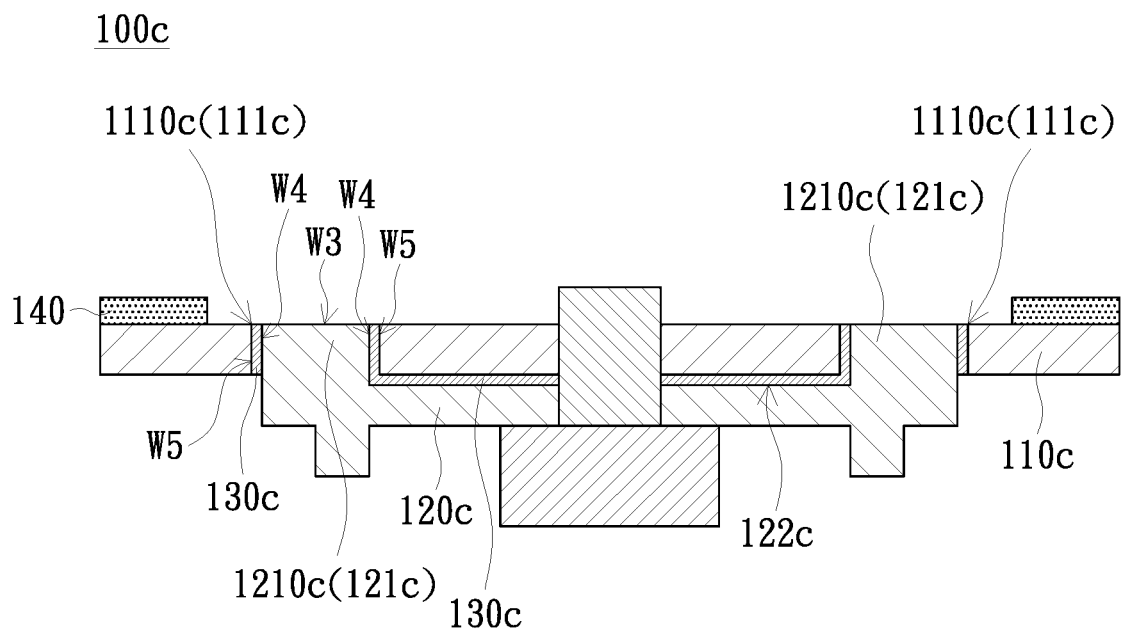
FIG. 4 is a schematic diagram of a wavelength conversion element in accordance with another embodiment of the invention.

FIG. 4 is a schematic diagram of a wavelength conversion element in accordance with another embodiment of the invention. The structure and advantages of the wavelength conversion element 100c of this embodiment are similar to those of the wavelength conversion element 100, and only the differences are described below. Please refer to FIG. 4. The reinforcement plate 120c of this embodiment has the surface 122c facing the substrate 110c, and the second engaging portion 121c includes the protruding structure 1210c protruding from the surface 122c. The first engaging portion 111c includes a through hole 1110c having a shape corresponding to the protrusion structure 1210c. In detail, the protrusion structure 1210c extends into the through hole 1110c, for example, but does not protrude from the substrate 110c through the through hole 1110c. For example, a top wall W3 of the protrusion structure 1210c of this embodiment may be co-planar with the substrate 110c, but the top wall W3 of the protrusion structure 1210c may be located in the through hole 1110c in the other embodiments. In this embodiment, the protrusion structure 1210c may have a side wall W4 connected to the surface 122c. The through hole 1110c may have a hole wall W5 opposite to the side wall W4. The adhesive layer 130c is disposed between the side wall W4 and the hole wall W5. In this way, the side wall W4 and the hole wall W5 can be connected with each other by the adhesive layer 130c. In addition, the adhesive layer 130c may extend toward the center of the substrate 110c and the reinforcement plate 120c from that between the side wall W4 and the hole wall W5, so as to further improve the firmness of the connection of the substrate 110c to the reinforcing plate 120c.

Figure 5:
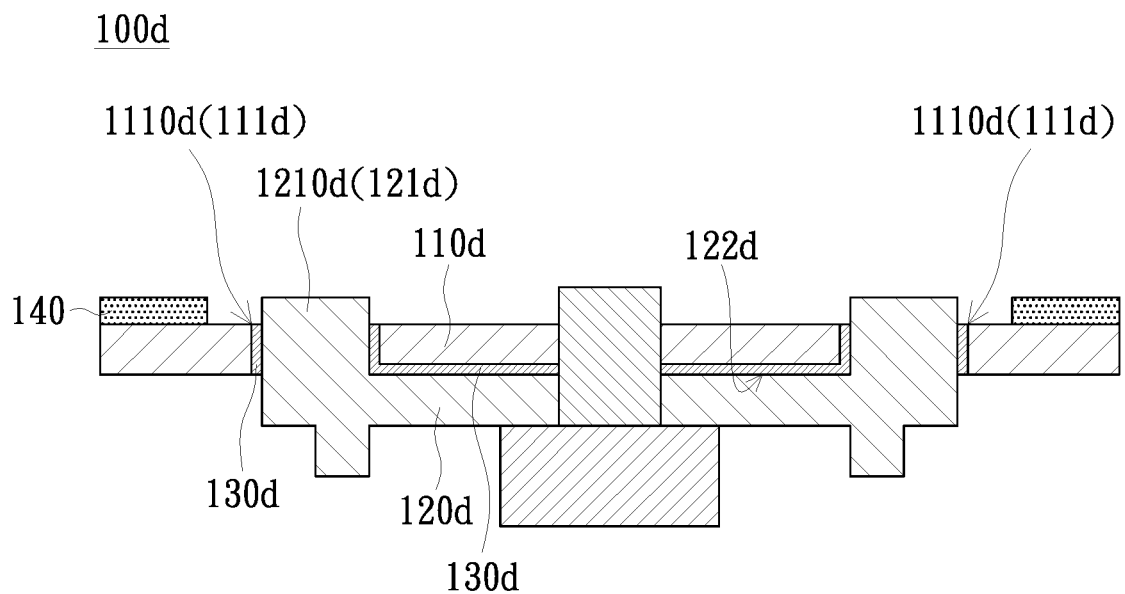
FIG. 5 is a schematic diagram of a wavelength conversion element in accordance with another embodiment of the invention.

FIG. 5 is a schematic diagram of a wavelength conversion element in accordance with another embodiment of the invention. The structure and advantages of the wavelength conversion element 100d of this embodiment are similar to those of the previous embodiment, and only the differences are described below. Please refer to FIG. 5. In this embodiment, an end of the protrusion structure 1210d may protrude from the substrate 110d through the through hole 1110d. In addition, the adhesive layer 130d is at least disposed between the through hole 1110d and the protrusion structure 1210d, and the surface 122d of the reinforcement plate 120d is connected to the substrate 110d. Similar to other embodiments, the adhesive layer 130d in this embodiment may extend toward the center of the substrate 110d and the reinforcement plate 120d from that between the through hole 1110d and the protrusion structure 1210d, so as to further improve the firmness of the connection of the substrate 110d to the reinforcement plate 120d.

Figure 6:
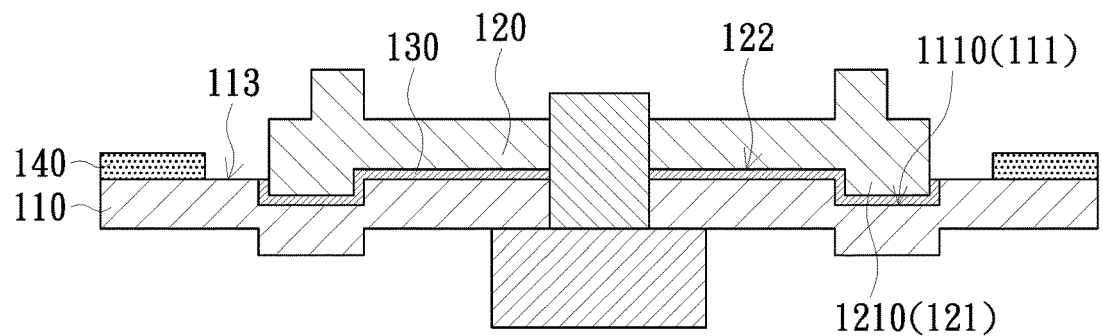
FIG. 6 is a schematic diagram of a wavelength conversion element in accordance with another embodiment of the invention.
Figure 7:
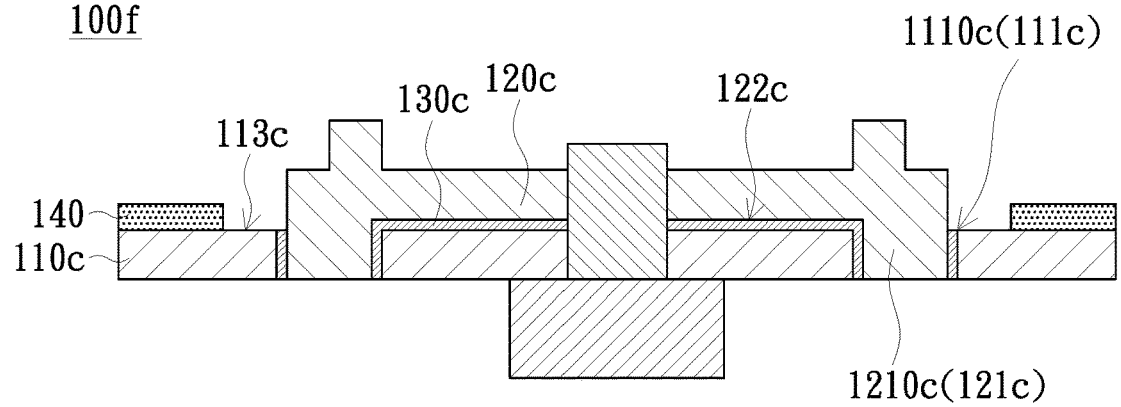
FIG. 7 is a schematic diagram of a wavelength conversion element in accordance with another embodiment of the invention.
Figure 8:
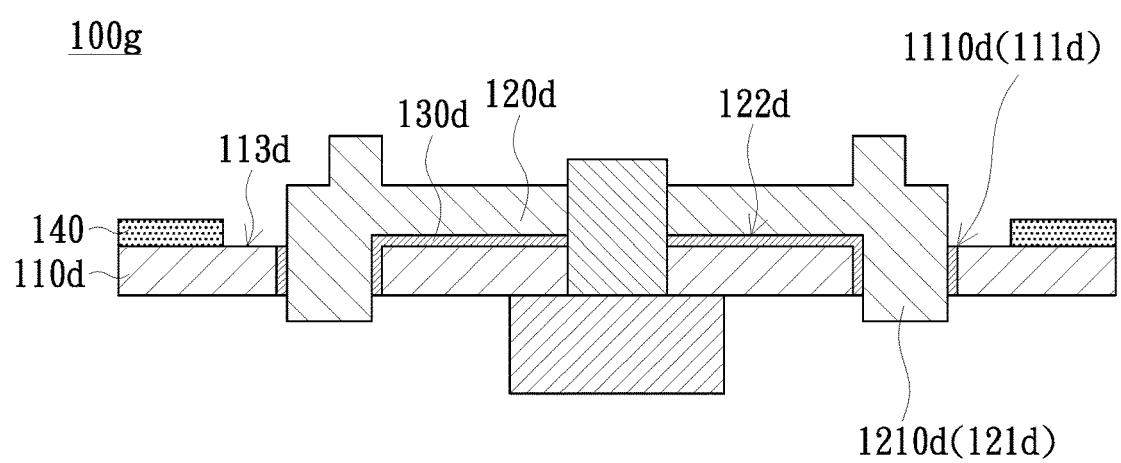
FIG. 8 is a schematic diagram of a wavelength conversion element in accordance with another embodiment of the invention.

In each of the previous embodiments, the reinforcement plate 120, 120a, 120b, 120c or 120d and the wavelength conversion layer 140 are located on the opposite sides of the substrate 110, 110a, 110b, 110c, or 110d, but the invention is not limited thereto. FIGS. 6 to 8 are schematic diagrams of wavelength conversion elements in accordance with another three embodiments of the invention. The structure and advantages of the wavelength conversion element 100e shown in FIG. 6 are similar to those of the wavelength conversion element 100 of FIG. 1, and the major difference is that the wavelength conversion layer 140 and the reinforcement plate 120 are located on the same side of the substrate 100 in FIG. 6. Similar to the embodiment of FIG. 1, the reinforcement plate 120 of this embodiment has the surface 122 facing the substrate 110, and the protrusion structure 1210 (i.e., the second engaging portion 121) protrudes from the surface 122, for example. The recess 1110 (i.e., the first engaging portion 111) is formed on the surface 113 of the substrate 110 facing the reinforcement plate 120. Different from the embodiment of FIG. 1, the wavelength conversion layer 140 of this embodiment is located on the surface 113, and is on the same side of the substrate 110 with the reinforcement plate 120 after the protrusion structure 1210 and the recess 1110 are jointed with each other. The same as the previous embodiments, the adhesive layer 130 of this embodiment may be disposed between the protrusion structure 1210 and the recess 1110, and may also extend toward the center of the substrate 110 and the reinforcement plate 120 from that between the protrusion structure 1210 and the recess 1110. The structure and advantages of the wavelength conversion element 100f of FIG. 7 are similar to those of the wavelength conversion element 100c of FIG. 4, and the major difference is that the wavelength conversion layer 140 and the reinforcement plate 120c are located on the same side of the substrate 100c in FIG. 7. Similar to the embodiment of FIG. 4, the protrusion structure 1210c (i.e., the second engaging portion 121c) of this embodiment may protrude from the surface 122c of the reinforcement plate 120c facing the substrate 110c. The through hole 1110c of the substrate 110c (i.e., the first engaging portion 111c) is disposed corresponding to the protrusion structure 1210c. Different from the embodiment of FIG. 4, the wavelength conversion layer 140 of this embodiment is located on the surface 113c of the substrate 110c facing the reinforcement plate 120c, and is on the same side of the substrate 110c with the reinforcement plate 120c after the protrusion structure 1210c and the through hole 1110c are jointed with each other. In addition, the adhesive layer 130c of this embodiment may be disposed between the protrusion structure 1210c and the through hole 1110c, and may also further extend toward the center of the substrate 110c and the reinforcement plate 120c. The structure and advantages of the wavelength conversion element 100g of FIG. 8 are similar to those of the wavelength conversion element 100d of FIG. 5, and the major difference is that the wavelength conversion layer 140 and the reinforcement plate 120d of FIG. 8 are located on the same side of the substrate 110d. Similarly, the protrusion structure 1210d (i.e., the second engaging portion 121d) of this embodiment protrudes from the surface 122d of the reinforcement plate 120d facing the substrate 110d, and the through hole 1110d (i.e., the first engaging portion 111d) is disposed corresponding to the protrusion structure 1210d. Different from the embodiment of FIG. 5, the wavelength conversion layer 140 of this embodiment is located on the surface 113d of the substrate 110d facing the reinforcement plate 120d, and is on the same side of the substrate 110d with the reinforcement plate 120d after the protrusion structure 1210d and the through hole 1110d are jointed with each other. In addition, the adhesive layer 130d of this embodiment may be disposed between the protrusion structure 1210d and the through hole 1110d, and may also further extend toward the center of the substrate 110d and the reinforcement plate 120d. In some embodiments, since the wavelength conversion layer 140 is on the same side of the substrate with the reinforcement plate, the outer diameter of the reinforcement plate may preferably be configured to be smaller than the outer diameter of the substrate. Hence, the transmission path of the excitation beam for irradiating the wavelength conversion layer 140 may not be blocked by the reinforcement plate.

Figure 9:
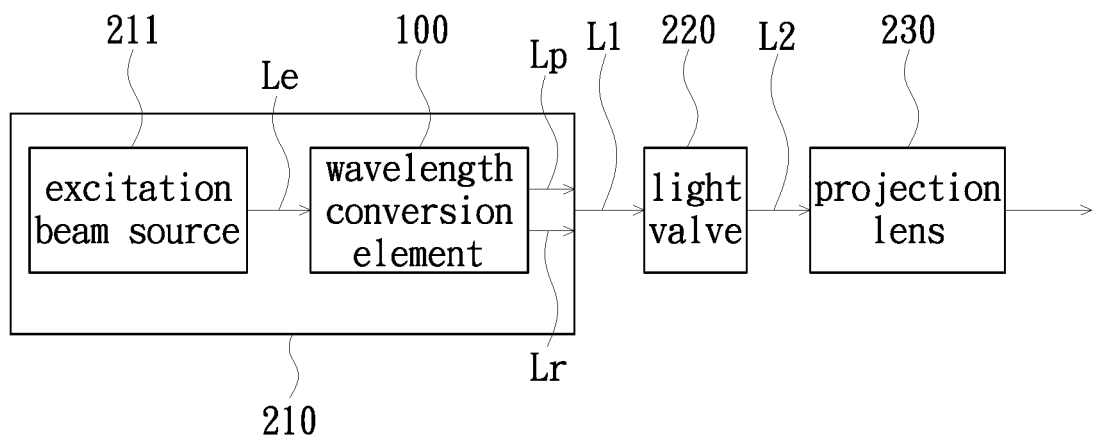
FIG. 9 is a block diagram of a projection apparatus in accordance with an embodiment of the invention.

FIG. 9 is a block diagram of a projection apparatus in accordance with an embodiment of the invention. Please refer to FIG. 9. The projection apparatus 200 includes an illumination system 210, a light valve 220 and a projection lens 230. The illumination system 210 is configured to provide an illumination beam L1. The light valve 220 is disposed on a transmission path of the illumination beam L1 to convert the illumination beam L1 into an image beam L2. The projection lens 230 is disposed on a transmission path of the image beam L2. The illumination system 210 includes an excitation beam source 211 and the aforementioned wavelength conversion element 100. The excitation beam source 211 is configured to provide an excitation beam Le. The wavelength conversion element 100 is disposed on a transmission path of the excitation beam Le.

The illumination system 210 includes the excitation beam source 211 and the wavelength conversion element 100. The excitation beam source 211 can include, for example, a beam emitting diode (LED) or a laser diode (LD), and the number of the beam emitting diodes or laser diodes may be one or more. For example, the beam emitting diodes (or laser diodes) can be arranged in a matrix when the number of the beam emitting diodes (or laser diodes) is more than one. The wavelength conversion element 100 is disposed on a transmission path of the excitation beam Le. The wavelength conversion element 100 rotates in time sequences to convert the excitation beam Le into a conversion beam Lp. The part of the excitation beam Le not being converted into the conversion beam Lp by the wavelength conversion element 100 is denoted as the beam Lr in FIG. 9. The aforementioned illumination beam L1 includes the beam Lr and the conversion beam Lp. Because the features of the wavelength conversion element 100 have been described in detail in the foregoing, no redundant detail is to be given herein.

The light valve 220 is, for example, a digital micro-mirror device (DMD), a liquid crystal on silicon panel (LCoS panel) or a liquid crystal display (LCD), but the invention is not limited thereto. In addition, this embodiment does not limit the number of the light valves 200. For example, the projection apparatus 200 of this embodiment may adopt a structure of single-chip liquid crystal display panel or three-chip liquid crystal display panel, but the invention is not limited thereto.

The projection lens 230 includes, for example, one or more optical lenses, and the diopters of the optical lenses can be the same or different to each other. For example, the optical lenses may include various of non-planar lens, such as a biconcave lens, a biconvex lens, a concavo-convex lens, a convexo-concave lens, a plano-convex lens, and a plano-concave lens, or any combination of the non-planar lens mentioned above. On the other hand, the projection lens 230 may also include a planer optical lens. The invention does not limit the specific structure of the projection lens 230.

In comparison with the background art, the projection apparatus 200 of this embodiment uses the aforementioned wavelength conversion element 100. Because the substrate 110 of the wavelength conversion element 100 has good structural strength and therefore the surface of the substrate 110 has a better flatness, the excitation beam Le can be accurately focused on the wavelength conversion layer 140 to maintain stable excitation efficiency. Therefore, the projection apparatus 200 has the advantage of good image quality. In addition, the wavelength conversion element 100 in the projection apparatus 200 of this embodiment can be replaced with any of the above-mentioned wavelength conversion elements 100b, 100c, 100d, 100e, 100f, and 100g.

In summary, the wavelength conversion element of the invention adopts the substrate having the first engaging portion and the reinforcement plate having the second engaging portion. Compared with the structure in which the metal ring and the substrate are attached in a plane manner in the known art, because the first engaging portion and the second engaging portion are concave-convex engaging structure, the substrate of the invention can not only maintain a good deformation resistance in the axial direction, but also improve the ability to resist deformation in the radial direction, thereby enhancing the structural strength of the substrate. Since the substrate has good structural strength, the surface of the substrate has better flatness, so that the excitation beam can be accurately focused on the wavelength conversion layer to maintain stable excitation efficiency. In addition, since the projection apparatus of the invention adopts the above-mentioned wavelength conversion element, the projection apparatus has the advantage of good image quality.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first engaging portion and the second engaging portion are only used for distinguishing various elements and do not limit the number of the elements.

What is claimed is:

1. A wavelength conversion element, comprising a substrate, a reinforcement plate, an adhesive layer, a wavelength conversion layer and a motor, wherein:
the substrate has a first engaging portion;
the reinforcement plate is connected to the substrate and has a second engaging portion, and the second engaging portion is correspondingly jointed with the first engaging portion;
the adhesive layer is connected between the substrate and the reinforcement plate and is disposed between the first engaging portion and the second engaging portion; and
the wavelength conversion layer is disposed on the substrate,
wherein the substrate and the reinforcement plate are ring-shaped and are sleeved on a shaft of the motor,
wherein the reinforcement plate is fixed on the motor,
wherein a rigidity of the reinforcement plate is greater than a rigidity of the substrate, and
wherein the reinforcement plate is not in direct contact with the wavelength conversion layer.

2. The wavelength conversion element according to claim 1, wherein the reinforcement plate further has a surface facing the substrate, the second engaging portion comprises a protrusion structure protruding from the surface, and the first engaging portion comprises a recess corresponding in shapes with the protrusion structure.

3. The wavelength conversion element according to claim 2, wherein the protrusion structure has a top wall opposite to the surface and a side wall connected between the surface and the top wall, the recess has a side face opposite to the side wall and a bottom face opposite to the top wall, and the adhesive layer is disposed between the side wall and the side face and between the top wall and the bottom face.

4. The wavelength conversion element according to claim 1, wherein the reinforcement plate and the substrate are ring-shaped, the reinforcement plate and the substrate each have an outer diameter, and the outer diameter of the reinforcement plate is smaller than, larger than, or equal to the outer diameter of the substrate.

5. The wavelength conversion element according to claim 1, wherein the wavelength conversion layer and the reinforcement plate are located on the same side of the substrate or opposite sides of the substrate.

6. A wavelength conversion element, comprising a substrate, a reinforcement plate, an adhesive layer, and a wavelength conversion layer, wherein:
the substrate has a first engaging portion;
the reinforcement plate is connected to the substrate and has a second engaging portion, and the second engaging portion is correspondingly jointed with the first engaging portion;
the adhesive layer is connected between the substrate and the reinforcement plate and is disposed between the first engaging portion and the second engaging portion; and
the wavelength conversion layer is disposed on the substrate,
wherein the reinforcement plate further has a surface facing the substrate, the second engaging portion comprises a protrusion structure protruding from the surface, and the first engaging portion comprises a through hole corresponding in shapes with the protrusion structure.

7. The wavelength conversion element according to claim 6, wherein the protrusion structure has a side wall connected to the surface, the through hole has a hole wall opposite to the side wall, and the adhesive layer is disposed between the side wall and the hole wall.

8. The wavelength conversion element according to claim 6, wherein an end of the protrusion structure is protruded from the substrate through the through hole, is co-planar with the substrate or is located in the through hole.

9. A projection apparatus, comprising an illumination system, a light valve and a projection lens, the illumination system being configured to provide an illumination beam, the light valve being disposed on a transmission path of the illumination beam to convert the illumination beam into an image beam, the projection lens being disposed on a transmission path of the image beam, and the illumination system comprising an excitation beam source and a wavelength conversion element, wherein:
the excitation beam source is configured to provide an excitation beam; and
the wavelength conversion element is disposed on a transmission path of the excitation beam, and the wavelength conversion element comprises a substrate, a reinforcement plate, an adhesive layer, a wavelength conversion layer and a motor, wherein:
the substrate has a first engaging portion;
the reinforcement plate is connected to the substrate and has a second engaging portion, and the second engaging portion is correspondingly jointed with the first engaging portion;
the adhesive layer is connected between the substrate and the reinforcement plate and is disposed between the first engaging portion and the second engaging portion; and
the wavelength conversion layer is disposed on the substrate,
wherein the substrate and the reinforcement plate are ring-shaped and are sleeved on a shaft of the motor,
wherein the reinforcement plate is fixed on the motor,
wherein a rigidity of the reinforcement plate is greater than a rigidity of the substrate, and
wherein the reinforcement plate is not in direct contact with the wavelength conversion layer.

* * * * *